US009695858B2

(12) United States Patent
Shiotani (10) Patent No.: US 9,695,858 B2
(45) Date of Patent: Jul. 4, 2017

(54) RIVET (71) Applicant: Kunimori Kagaku Co., Ltd., Aichi-ken (JP)

(72) Inventor: Yoichi Shiotani, Komaki (JP)

(73) Assignee: Kunimori Kagaku Co., Ltd., Aichi-ken (JP)

( * ) Notice: Subject to any disclaimer, the term of this patent is extended or adjusted under 35 U.S.C. 154(b) by 6 days.

(21) Appl. No.: 14/892,879

(22) PCT Filed: Aug. 22, 2014

(86) PCT No.: PCT/JP2014/072038
§ 371 (c)(1),
(2) Date: Nov. 20, 2015

(87) PCT Pub. No.: WO2015/162809
PCT Pub. Date: Oct. 29, 2015

(65) Prior Publication Data
US 2016/0123366 A1 May 5, 2016

(30) Foreign Application Priority Data

Apr. 21, 2014 (JP) .................................. 2014-087517

(51) Int. Cl.
*F16B 19/02* (2006.01)
*F16B 13/08* (2006.01)
(Continued)

(52) U.S. Cl.
CPC ............ *F16B 19/02* (2013.01); *F16B 5/0642* (2013.01); *F16B 13/08* (2013.01); *F16B 19/1081* (2013.01); *F16B 13/126* (2013.01)

(58) Field of Classification Search
CPC .............................. F16B 19/02; F16B 19/1081
(Continued)

(56) References Cited

U.S. PATENT DOCUMENTS 1,210,451 A * 1/1917 France ................ F16B 13/0808
411/345
3,188,905 A * 6/1965 Millet ................... F16B 19/086
411/48
(Continued)

FOREIGN PATENT DOCUMENTS

CN 1136121 11/1996
CN 1136121 A 11/1996
(Continued)

OTHER PUBLICATIONS

English translation of International Preliminary Report on Patentability dated Oct. 25, 2016.
(Continued)

*Primary Examiner* — Flemming Saether
(74) *Attorney, Agent, or Firm* — Kilpatrick Townsend & Stockton LLP (57) ABSTRACT A rivet includes a sleeve, which has a flange, and a core member, which is inserted into the sleeve. The distal end of the sleeve is coupled to a plurality of pivoting pieces via thin hinges. By inserting the core member into the sleeve, each pivoting piece is pushed against the core member to pivot outward, and a laminated member, which is located between the flange and each pivoting piece, is fixed. A projection is arranged on the basal end surface of each pivoting piece. A hook portion is arranged on the head of the core member to project radially outward of the core member. When the core member is inserted into the sleeve, the hook portion of the core member moves past the projection of each pivoting piece in an outwardly pivoted state to fix the pivoting piece.

4 Claims, 5 Drawing Sheets (51) Int. Cl.
*F16B 5/06* (2006.01)
*F16B 19/10* (2006.01)
*F16B 13/12* (2006.01)

(58) Field of Classification Search
USPC .............................................. 411/344, 45–48
See application file for complete search history.

(56) References Cited

U.S. PATENT DOCUMENTS

| | | | | |
|---|---|---|---|---|
| 3,205,759 | A | | 9/1965 | Texier |
| 4,022,100 | A | * | 5/1977 | Johnson ................ F16B 13/001 411/71 |
| 4,407,535 | A | * | 10/1983 | Ohnuki .................. B65D 55/14 292/27 |
| 4,669,936 | A | * | 6/1987 | Camilleri ................ F16B 13/12 24/543 |
| 5,037,257 | A | * | 8/1991 | Kubic .................... F16B 13/002 411/30 |
| 5,498,110 | A | | 3/1996 | Stencel |
| 5,533,851 | A | * | 7/1996 | Remmers ............ F16B 19/1081 411/344 |
| 5,634,751 | A | | 6/1997 | Stencel |
| 6,004,088 | A | * | 12/1999 | Hunt .................... F16B 13/0808 411/21 |
| 6,138,419 | A | | 10/2000 | Sekiguchi |
| 6,615,459 | B2 | * | 9/2003 | Sano ..................... F16B 5/0642 24/297 |
| 6,634,840 | B1 | * | 10/2003 | Salmon ............... F16B 19/1081 411/344 |
| 7,850,408 | B2 | * | 12/2010 | Ernst ................... F16B 13/0808 411/21 |
| 8,764,364 | B2 | * | 7/2014 | Brown ................. F16B 13/003 248/304 |
| 2011/0206477 | A1 | | 8/2011 | Brewer |

FOREIGN PATENT DOCUMENTS

| | | |
|---|---|---|
| CN | 102187104 | 9/2011 |
| CN | 102187104 A | 9/2011 |
| CN | 102853209 A | 1/2013 |
| DE | 69522439 | 12/2001 |
| DE | 69522439 T2 | 12/2001 |
| JP | 46-16210 B1 | 5/1971 |
| JP | 51-135268 U | 11/1976 |
| JP | 2006-083936 A | 3/2006 |
| JP | 2013-238286 A | 11/2013 |

OTHER PUBLICATIONS

English translation of Office Action corresponding to the Chinese Parent Application No. 201480031369.7, dated Aug. 3, 2016.

* cited by examiner

RIVET

TECHNICAL FIELD

The present invention relates to a rivet operable from one direction.

BACKGROUND ART

A rivet disclosed in Patent Document 1 is known as a rivet operable from one direction. The rivet of Patent Document 1 includes a sleeve having a flange and a core member, which is inserted into the sleeve. A mounting hole is arranged in a laminated layer sheet, in which a plurality of sheets is laminated. After the sleeve is inserted into the mounting hole from one direction, the core member is inserted into the sleeve from the same direction in the similar manner. In this way, the sheets are fixed to one another.

In particular, in the rivet of Patent Document 1, an opening is formed in the tubular body of the sleeve. A plurality of pivoting pieces is coupled to the edge of the opening via thin hinges. When the core member is inserted into the sleeve, each pivoting piece is pushed by the core member so that the pivoting piece pivots outward. As a result, the laminated layer sheet is sandwiched by the flange and the pivoting pieces in the outwardly pivoted state, and is integrally fixed.

In the rivet of Patent Document 1, a plurality of projections is formed on the outer circumferential surface of the core member, and a plurality of recesses is formed on the inner circumferential surface of the sleeve. When the core member is inserted into the sleeve, each projection of the core member engages with the corresponding recess of the sleeve. This restricts the core member from escaping from the sleeve. Such escape of the core member is restricted so that the core member remains in the sleeve. This restricts the pivoting pieces from pivoting inward.

PRIOR ART DOCUMENT

Patent Document

Patent Document 1: Japanese Laid-Open Patent Publication No. 2006-083936

SUMMARY OF THE INVENTION

Problem that the Invention is to Solve

In some cases, the reverse side of a part to which a rivet is to be mounted cannot be checked. If the rivet of Patent Document 1 is mounted to such a part, it is determined that the operation of the rivet is completed, i.e., the pivoting pieces have pivoted outward, when the core member is inserted into the sleeve and the projections of the core member have engaged with the recesses of the sleeve. However, this determination method does not tell whether the pivoting pieces are actually in an outwardly pivoted state. Thus, for example, even if pivoting action of the pivoting pieces is interrupted with some reasons, it is determined that the operation of the rivet is completed normally when the projections of the core member engage with the recesses of the sleeve.

Accordingly, it is an objective of the present invention to provide a rivet with which it is recognizable that the pivoting pieces have pivoted outward.

Means for Solving the Problems

To achieve the above objective, a rivet according to claim 1 includes a sleeve, which has a flange, a core member, which is inserted into the sleeve, a plurality of pivoting pieces, which is arranged on a distal end of the sleeve, and hinges, which couple the distal end of the sleeve to the respective pivoting pieces. Each of the pivoting pieces is pushed against the core member by inserting the core member into the sleeve, so that the pivoting pieces pivot outward. A projection is arranged on a basal end surface of each of the pivoting pieces to fix the pivoting piece. A hook portion is arranged on the core member to project outward in a radial direction of the core member. The pivoting pieces are fixed when the core member is inserted into the sleeve so that the hook portions of the core member move past the projections of the pivoting pieces in an outwardly pivoted state.

According to the configuration, the resistance changes when the hook portion of the core member moves past the projections of the pivoting pieces in the outwardly pivoted state. With the change in the resistance, it is directly recognized that the pivoting pieces have pivoted outward and are fixed. Furthermore, the projections of the pivoting pieces disrupt the hook portion of the core member in a state in which the pivoting pieces have pivoted outward and are fixed. This restricts the pivoting pieces from returning from the outwardly pivoted state, i.e., pivoting inward.

Preferably, in the rivet, the pivoting pieces are fixed when the hook portion of the core member moves past the projections of the pivoting pieces in the outwardly pivoted state, and the circumferential surface of the hook portion comes into contact with the basal end surfaces of the pivoting pieces.

In this case, after the hook portion of the core member moves past the projections of the pivoting pieces, the basal end surfaces of the pivoting pieces strike the circumferential surface of the core member. The impact at that moment is conveyed to the operator as a sufficient sensation of clicking. Thus, it is easily recognized that the pivoting pieces have pivoted outward and are fixed. Furthermore, in the state in which the pivoting pieces have pivoted outward and are fixed, the circumferential surface of the hook portion contacts the basal end surfaces of the pivoting pieces. This reliably restricts the pivoting pieces from returning from the outwardly pivoted state.

Preferably, in the rivet, a plurality of protective walls is arranged on the distal end of the sleeve to protect the pivoting pieces in the outwardly pivoted state.

In this case, when a finger or an object touches or is caught by some of the pivoting pieces in a fixed state, an impact may be applied to the pivoting pieces. However, such an impact is limited in this case. As a result, the fixed state of the rivets is restricted from being cancelled by a strong impact applied to the pivoting pieces.

Preferably, in the rivet, each of the protective walls has a height from the distal end of the sleeve, and the height is set to be the same as or greater than that of each of the pivoting pieces in the outwardly pivoted state.

Preferably, in the rivet, the lateral surface of each projection that faces the hinge is inclined such that the distance from the corresponding hinge increases from a basal end toward a distal end.

In this case, when the core member pushes each pivoting piece, the pivoting piece smoothly pivots outward.

Effects of the Invention

The rivet according to the present invention allows for recognition that the pivoting piece have pivoted outward.

EMBODIMENTS OF THE INVENTION

A rivet R according to the present invention will now be described with reference to the drawings.

Figure 1:
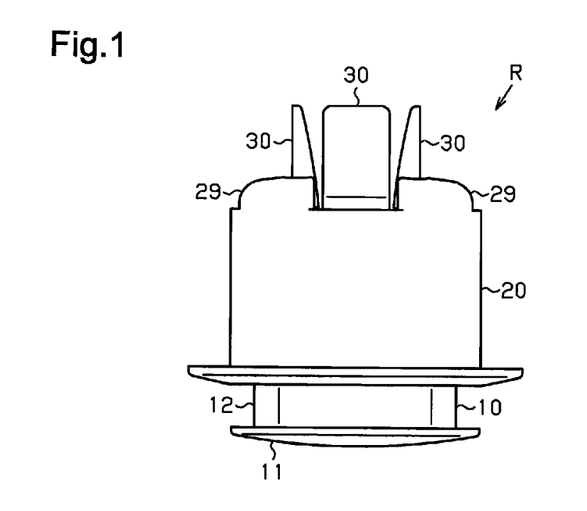
FIG. 1 is a lateral view of a rivet.

As shown in FIG. 1, the rivet R of the present embodiment includes a core member 10 and a sleeve 20, into which the core member 10 is inserted. The core member 10 is made of plastic and integrally molded. The sleeve 20 is also made of plastic and integrally molded. For example, polypropylene, polyamide, or polyacetal is used as the plastic of which the core member 10 and the sleeve 20 are made.

Figure 2A:
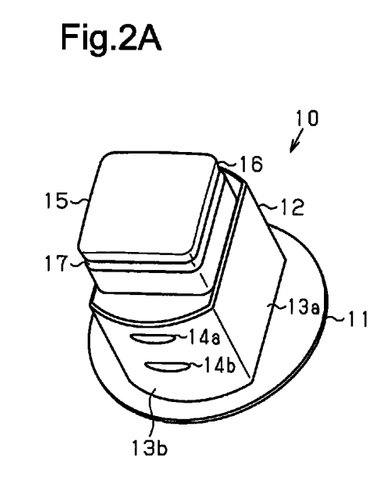
FIG. 2A is a perspective view of a core member, illustrating the structure on the distal side.
Figure 2B:
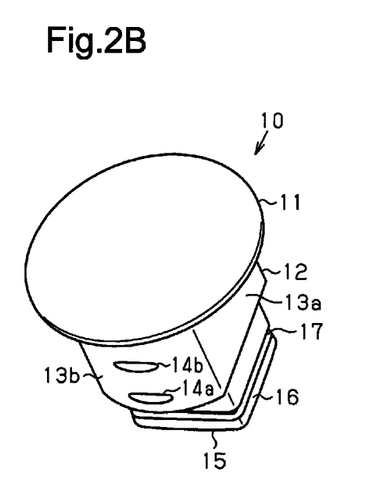
FIG. 2B is a perspective view of the core member, illustrating the structure on the basal side.

As shown in FIGS. 2A and 2B, the core member 10 includes a disc-shaped base 11. The surface of the base 11 on the basal side of the core member 10 is gently curved outward. The core member 10 includes a columnar shaft 12, which extends from the base 11. The shaft 12 has a pair of first outer surfaces 13a and a pair of second outer surfaces 13b. The first outer surfaces 13a are planer and the second outer surfaces 13b are curved outward. The cross-section that includes the first outer surfaces 13a, which are opposed to each other, and the second outer surfaces 13b, which are opposed to each other, has a substantially oval shape. Each of the second outer surfaces 13b includes a first restrictive depression 14a and a second restrictive depression 14b, which extend in the circumferential direction of the shaft 12. The first restrictive depression 14a and the second restrictive depression 14b are lined on the second outer surface 13b in the axial direction of the shaft 12.

A quadrilateral head 15, which has a substantially square cross-section, is arranged on the distal end of the shaft 12. The head 15 includes a hook portion 16, which projects radially outward of the core member 10. In the present embodiment, a recess 17, which is a groove extending in the circumferential direction of the head 15, is formed. This forms the hook portion 16 on the distal side from the recess 17 of the head 15 to project outward in the radial direction of the core member 10.

Figures 3A, 3B, 3C:
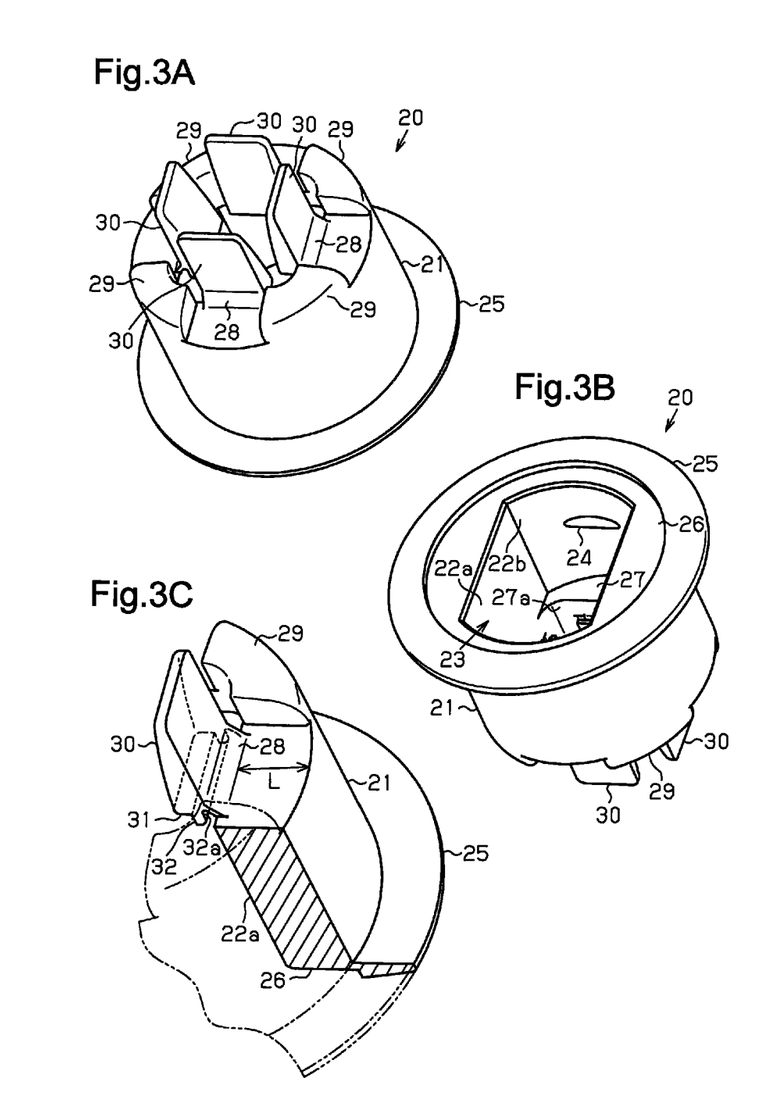
FIG. 3A is a perspective view of a sleeve, illustrating the structure on the distal side.
FIG. 3B is a perspective view of the sleeve, illustrating the structure on the basal side.
FIG. 3C is a perspective, cross-sectional view of the sleeve, illustrating the surrounding of one of pivoting pieces.

As shown in FIGS. 3A and 3B, the sleeve 20 includes a cylindrical body 21. The interior of the body 21 has a pair of first inner surfaces 22a and a pair of second inner surfaces 22b. The first inner surfaces 22a are planer and opposed to each other. The second inner surfaces 22b are curved inward and opposed to each other. The body 21 includes an accommodation portion 23, which is surrounded by the opposed first inner surfaces 22a and the opposed second inner surfaces 22b and has a substantially oval cross-section. The accommodation portion 23 is opened to the outside at the basal end and the distal end of the body 21. Each of the second inner surfaces 22b includes a restrictive projection 24, which extends in the circumferential direction of the body 21.

As shown in FIG. 3B, a ring-shaped flange 25 is arranged on the outer circumference at the basal end of the body 21. As shown in FIG. 1, the basal end surface of the body 21, which includes the outer surface of the flange 25, is gently curved outward. The basal end surface of the body 21 includes an accommodation depression 26, which accommodates the base 11 of the core member 10. An end wall 27 is arranged at the distal end of the body 21. The end wall 27 includes an opening 27a, which has a substantially square shape, which is slightly larger than the head 15 of the core member 10.

As shown in FIGS. 3A and 3C, a thin hinge 28 is arranged along each side of the opening 27a, i.e., each of four sides of the square, on the distal end surface of the body 21. Each of the hinges 28 extends toward the distal end in the axial direction of the body 21 while being inclined inward.

Each of the hinges 28 has a distal end coupled to a pivoting piece 30, which extends toward the distal end in the axial direction of the body 21. In other words, the distal end surface of the body 21 is coupled to four pivoting pieces 30 via the respective hinges 28 such that each of the pivoting pieces 30 is located on the corresponding one of the four sides of the square. As shown in FIG. 3C, each of the pivoting pieces 30 has a measurement in the axial direction of the body 21. The measurement is set to be longer than a distance L between the base of the corresponding hinge 28 and the circumferential edge of the body 21 on the distal end surface of the body 21.

As shown in FIG. 3C, each of the pivoting pieces 30 includes a basal end surface 31, and a projection 32 is arranged on the basal end surface 31. The projection 32 is a protrusion extending in the width direction of the pivoting piece 30. In particular, each of the projections 32 is a protrusion extending along the corresponding side of the opening 27a of the accommodation portion 23, i.e., the corresponding one of the four sides of a square. Each of the projections 32 includes a lateral surface 32a that faces the corresponding hinge 28. The lateral surface 32a is a slope that is inclined away from the corresponding hinge 28 from the basal end toward the distal end of the projection 32. In the present embodiment, only a part on the distal side of the lateral surface 32a is formed as the slope.

As shown in FIG. 3A, a plurality of protective walls 29 is arranged on the distal end surface of the body 21. The protective walls 29 extend along the outer circumference of the body 21 to form arc-like shapes. The protective walls 29 are formed to avoid the hinges 28 and the pivoting pieces 30 in the circumferential direction of the body 21. In other words, in the present embodiment, the number of the protective walls 29 is total four, and the protective walls 29 are arranged at the respective corners in the opening of the accommodation portion 23, i.e., portions corresponding to the four corners of a square. A space exists between adjacent ones of the protective walls 29 to allow the corresponding pivoting piece 30 to pivot outward. Each of the protective walls 29 has a height greater than the thickness of the corresponding pivoting piece 30.

Figure 4A:
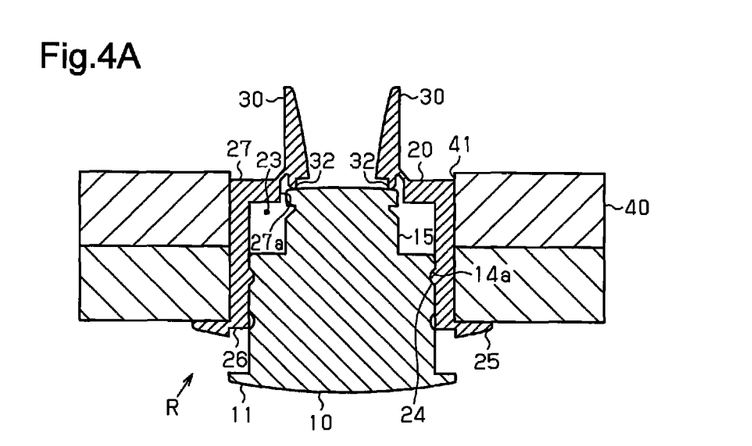
FIGS. 4A and 4B are end views of the rivet, illustrating a process of fixing a laminated member.

As shown in FIG. 1 and FIG. 4A, the rivet R is assembled in a basic state by inserting a substantially half of the core member 10 into the accommodation portion 23 of the sleeve 20. In this state, the projections 24 of the sleeve 20 engage with the respective first restrictive depressions 14a, which are the ones of the restrictive depressions 14a and 14b that are located on the distal side of the core member 10. This fixes the rivet R in the basic state. The end surface of the head 15 in the core member 10 is in contact with the projection 32 of each pivoting piece 30 in the sleeve 20.

With reference to FIGS. 4A to 5D, a method for fixing a laminated member 40, which is formed by laminating two plate-like members, using the rivet R will now be described.

As shown in FIG. 4A, the laminated member 40 includes a mounting hole 41, which extends through the laminated member 40. The rivet R in the basic state is inserted into the mounting hole 41 from the bottom, and the flange 25 of the sleeve 20 comes into contact with the bottom surface of the laminated member 40. The core member 10 is pushed from the bottom and inserted into the accommodation portion 23 of the sleeve 20.

Figure 4B:
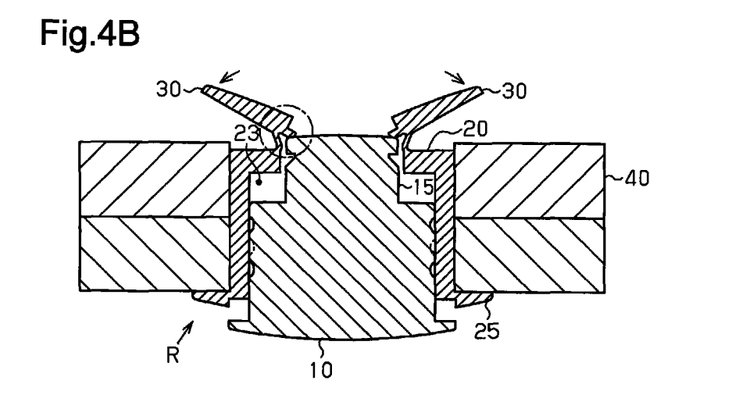
Figure 4C:
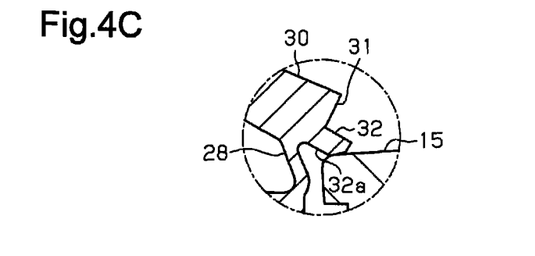
FIG. 4C is an enlarged view showing part of the rivet of FIG. 4B.

At the first step in the process for inserting the core member 10 into the accommodation portion 23 of the sleeve 20, each pivoting piece 30 of the sleeve 20 pivots outward as shown in FIG. 4B. In particular, the projection 32 of each pivoting piece 30 is pushed upward by the head 15 of the core member 10 so that the pivoting piece 30 pivots outward to spread while bending the corresponding hinge 28.

The projection 32 of each pivoting piece 30 is in contact with the head 15 of the core member 10. The lateral surface 32a of each projection 32 that faces the corresponding hinge 28 is formed as a slope. Along with the upward movement of the head 15 in the core member 10, a portion of each projection 32 that is in contact with the head 15 moves along the slope (the lateral surface 32a). Thus, the upward force pushing each pivoting piece 30 is converted into force that causes the pivoting piece 30 to pivot. As a result, the pivoting piece 30 smoothly pivots outward.

Figure 5A:
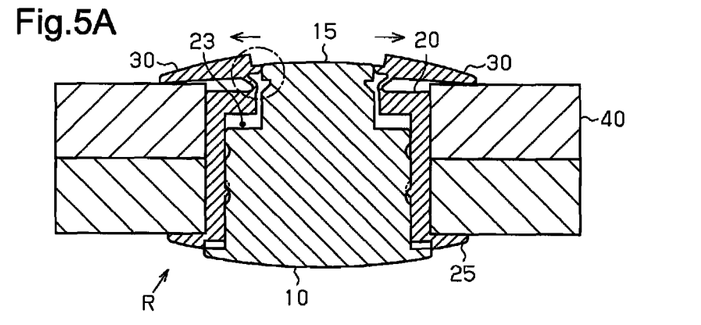
FIG. 5A is an end view of the rivet, illustrating a process of fixing the laminated member.
Figure 5B:
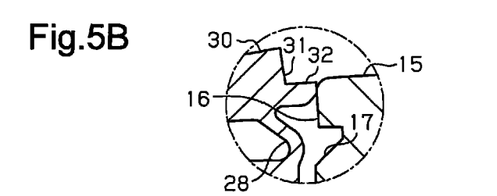
FIG. 5B is an enlarged view showing part of the rivet of FIG. 5A.

When the core member 10 is further inserted, the first step shifts to the second step. The head 15 of the core member 10 is inserted inside the pivoting pieces 30 as shown in FIG. 5A. At this time, the hook portion 16 of the head 15 engages the projection 32 of each pivoting piece 30 so that the pivoting piece 30 is pushed outward, i.e., in the radially outward direction of the core member 10, by the hook portion 16.

Figure 5C:
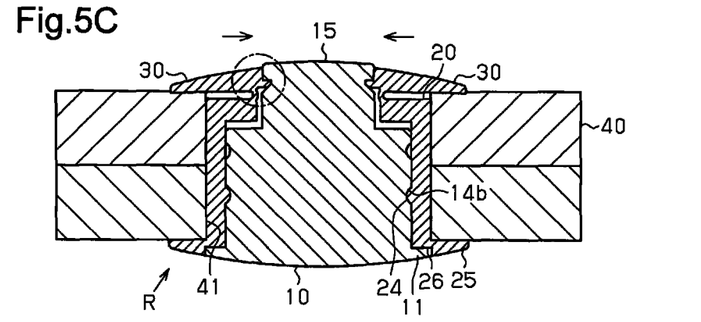
FIG. 5C is an end view of the rivet, illustrating a process of fixing the laminated member.
Figure 5D:
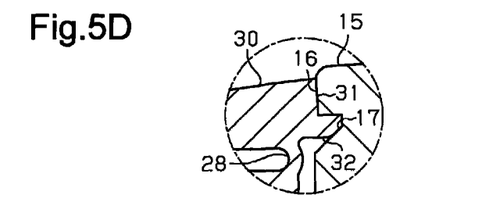
FIG. 5D is an enlarged view showing part of the rivet of FIG. 5C.

When the core member 10 is further inserted, the second step shifts to the third step. As shown in FIGS. 5C and 5D, the hook portion 16 of the head 15 moves past the projection 32 of each pivoting piece 30. The projection 32 is then accommodated in the recess 17, which is arranged on the circumferential surface of the head 15 in the core member 10. Along with this, the basal end surface 31 of each pivoting piece 30 comes into contact with the circumferential surface of the hook portion 16 of the head 15 in the core member 10. Accordingly, the state of the rivet R becomes a fixed state, in which each pivoting piece 30 that has completely pivoted outward is restricted from returning to the original position, i.e., the pivoting piece 30 is restricted from pivoting inward, and the core member 10 is restricted from escaping from the sleeve 20. Next, when the hook portion 16 of the head 15 moves past the projection 32 of each pivoting piece 30, the insertion of the core member 10 into the sleeve 20 is finished. The fixation of the laminated member 40 using the rivet R is completed.

In this fixed state, the restrictive projections 24, which are arranged in the sleeve 20, engage with the respective second restrictive depressions 14b, which are arranged in the core member 10 when the hook portion 16 of the head 15 moves past the projection 32 of each pivoting piece 30. The second restrictive depressions 14b are the ones of the restrictive depressions 14a and 14b that are located on the basal side of the core member 10. This engaging arrangement also restricts the core member 10 from escaping from the sleeve 20.

As shown in FIG. 5C, when the rivet R inserted into the mounting hole 41 of the laminated member 40 is shifted from the basic state to the fixed state, the laminated member 40 is tightly held by the pivoting pieces 30, which are fixed in an outwardly pivoted state, and the flange 25, which is arranged in the sleeve 20. This integrally fixes the laminated member 40. The rivet R is preferably formed such that at least a part of each pivoting piece 30 in an outwardly pivoted state presses the surface of the laminated member 40 when the state of the rivet R shifts to the fixed state. This holds the laminated member 40 with relatively large force so that the laminated member 40 is firmly fixed.

Figure 6A:
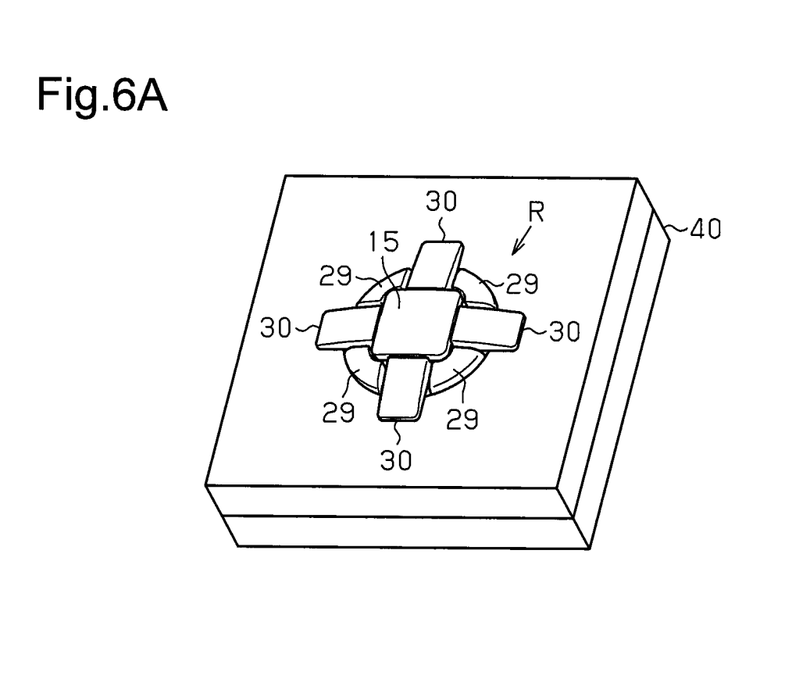
FIGS. 6A and 6B are perspective views of the laminated member fixed by the rivet.

As shown in FIG. 6A, each pivoting piece 30 in an outwardly pivoted state is arranged between the corresponding adjacent protective walls 29 on the distal side of the rivet R in the fixed state. In other words, the protective walls 29, which are formed higher than the pivoting piece 30, are located at the sides of the pivoting piece 30. The protective walls 29 protect the pivoting piece 30.

Figure 6B:
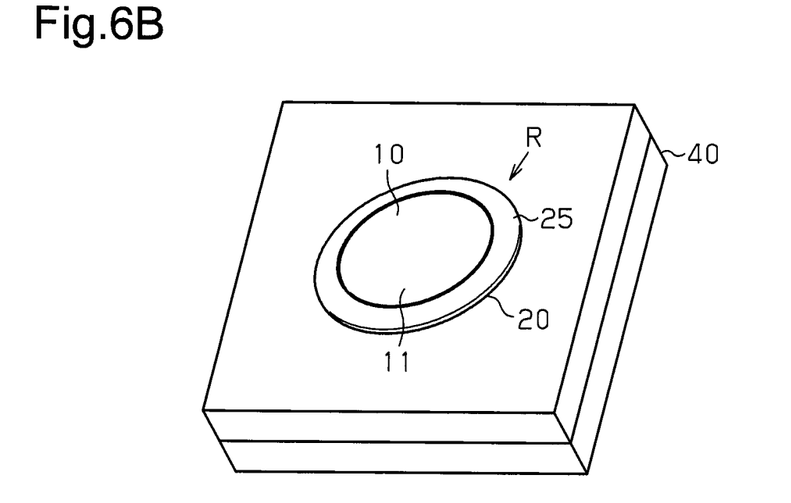

As shown in FIGS. 5C and 6B, the base 11 of the core member 10 is accommodated in the accommodation depression 26 arranged on the basal side of the sleeve 20 on the basal side of the rivet R in the fixed state. Thus, the surface on the basal side of the rivet R is gently curved outward to be substantially flush as a whole.

Operation of the rivet R according to the present embodiment will now be described.

As shown in FIGS. 5A to 5D, each projection 32 is arranged on the basal end surface 31 of the corresponding pivoting piece 30 in the sleeve 20. The hook portion 16 is arranged on the circumferential surface of the head 15 in the core member 10. Each pivoting piece 30 pivots outward by inserting the core member 10 into the accommodation portion 23 of the sleeve 20. The hook portion 16 of the head 15 moves past the projection 32 of the pivoting piece 30. The state of the rivet R then shifts to the fixed state. When the hook portion 16 of the head 15 moves past the projection 32 of the pivoting piece 30, the resistance changes. Based on the change in the resistance, completion of operation of the rivet R can be determined. Accordingly, each pivoting piece 30 in an outwardly pivoted state is fixed, and it is accurately recognized that the state of the rivet R has shifted to the normal fixed state.

In the rivet R according to the present embodiment, when the hook portion 16 moves past the projections 32, the circumferential surface of the hook portion 16 comes into contact with the basal end surface 31 of the corresponding pivoting piece 30. Immediately before the circumferential surface of the hook portion 16 comes into contact with the basal end surface 31 of the pivoting piece 30, the projection 32 engages the hook portion 16, and the pivoting piece 30 is temporarily pushed outward. The basal end surface 31 of the pivoting piece 30, which is pushed outward, swiftly comes into contact with the circumferential surface of the hook portion 16 by the restoring force of the pivoting piece 30. As a result, the impact when the basal end surface 31 of each pivoting piece 30 comes into contact with the circumferential surface of the hook portion 16 is conveyed to the operator as a sufficient sensation of clicking. Thus, it is easier to recognize that the state of the rivet R has shifted to the normal fixed state.

The advantages of the present embodiment will now be described.

(1) The rivet R includes the sleeve 20, which has the flange 25, and the core member 10, which is inserted into the sleeve 20. The distal end of the sleeve 20 is coupled to the pivoting pieces 30 via the thin hinges 28. The core member 10 is inserted into the sleeve 20 so that the core member 10 pushes each pivoting piece 30, and the pivoting piece 30 pivots outward. Thus, the laminated member 40, which is located between the flange 25 and the pivoting piece 30, is fixed. Each projection 32 is arranged on the basal end surface 31 of the corresponding pivoting piece 30. The hook portion 16, which projects radially outward of the core member 10, is arranged in the head 15 of the core member 10. When the core member 10 is inserted in the sleeve 20, the hook portion 16 of the core member 10 moves past the projection 32 of each pivoting piece 30 in an outwardly pivoted state to fix the pivoting piece 30.

According to the above configuration, when the laminated member 40 is fixed using the rivet R, it is easy to recognize that the state of the rivet R has been shifted to the fixed state and the operation of the rivet R is completed.

(2) The hook portion 16 of the core member 10 moves past the projection 32 of each pivoting piece 30 in an outwardly pivoted state and the circumferential surface of the hook portion 16 comes into contact with the basal end surface 31 of the pivoting piece 30. This fixes each pivoting piece 30.

According to the above configuration, it is easier to recognize that the state of the rivet R shifts to the fixed state to complete operation of the rivet R. Moreover, in the fixed state, each pivoting piece 30 is further strongly restricted from returning (pivoting inward) since the circumferential surface of the hook portion 16 comes into contact with the basal end surface 31 of each pivoting piece 30.

(3) The protective walls 29 are arranged on the distal end of the sleeve 20 to avoid a portion in which the hinges 28 and the pivoting pieces 30 are arranged in the circumferential direction of the body 21. In other words, the protective walls 29 are arranged on the distal end of the sleeve 20 in a portion that does not overlap pivoting tracks of the pivoting pieces 30.

When a finger or an object touches or is caught by some of the pivoting pieces 30, a strong impact may be applied to the pivoting pieces 30 of the rivet R mounted on the laminated member 40 to cancel the fixed state of the rivet R. According to the above configuration, the arrangement of the protective walls 29 limits a touch on the pivoting pieces 30 from the side of the rivet R. Thus, it is not easy to apply an impact to the pivoting pieces 30 from the side of the rivet R. Accordingly, the resistance to an impact from the side of the rivet R is improved.

(4) The height of each protective wall 29 from the distal end of the sleeve 20 is set to be greater than the thickness of each pivoting piece 30. In other words, each protective wall 29 is higher than the pivoting piece 30 in an outwardly pivoted state.

According to the above configuration, the protective walls 29 are higher than each pivoting piece 30. This limits a touch on the pivoting pieces 30 from the distal side of the rivet R, and it is not easy to apply an impact to the pivoting pieces 30 from the distal side of the rivet R. Thus, the resistance to an impact from the distal side of the rivet R is improved.

(5) Each projection 32 is a protrusion extending in the width direction of the corresponding pivoting piece 30. The lateral surface of the projection 32 that faces the corresponding hinge 28 is inclined to be away from the hinge 28 from the basal end toward the distal end of the projection 32.

According to the above configuration, when the core member 10 pushes each pivoting piece 30, the pivoting piece 30 smoothly pivots outward.

(6) The shaft 12 of the core member 10 has a substantially oval cross-section, and the accommodation portion 23 of the sleeve 20 has a substantially oval cross-section.

According to the above configuration, when the core member 10 is inserted in the accommodation portion 23 of the sleeve 20, the angle in the radial direction of the core member 10 that can be inserted into the accommodation portion 23 is limited to a particular angle. In other words, the core member 10 can be inserted in the accommodation portion 23 only when the angle in the radial direction of the core member 10 is the particular angle at which the shape of the shaft 12 in the core member 10 fits to the shape of the accommodation portion 23. Thus, if the core member 10 is inserted in the accommodation portion 23 at a wrong angle, a problem may occur that each pivoting piece 30 cannot pivot normally. However, such a problem is avoided.

The present embodiment may be modified in the following forms.

In the above-illustrated embodiment, four pivoting pieces 30 are arranged. However, the number of pivoting pieces 30 is not limited to four. For example, the rivet R may have two pivoting pieces 30 by omitting two of the four pivoting pieces 30 that are opposed to each other in the embodiment.

When the sleeve 20 has a plurality of pivoting pieces 30, the arrangement of the pivoting pieces 30 in the circumferential direction of the sleeve 20 is not limited to a particular arrangement. However, in order to maintain the fixed state of the rivet R, the bias of clipping force by each pivoting piece 30 and the flange 25 in the circumferential direction of the sleeve 20 is preferably reduced by arranging the pivoting pieces 30 at equal intervals in the circumferential direction of the sleeve 20. For example, in a case in which three pivoting pieces 30 are provided for the sleeve 20, the pivoting pieces 30 are preferably arranged at respective sides of an equilateral triangle. The cross-section of the head 15 in the core member 10 may have a shape modified according to the arrangement of the pivoting pieces 30.

The lateral surface 32a of the projection 32 of each pivoting piece 30 may be shaped like a planer slope or a curved slope. The lateral surface 32a of the projection 32 of the each pivoting piece 30 may be a surface other than a slope.

In the above-illustrated embodiment, the projection 32 of each pivoting piece 30 is a protrusion. However, the shape of each projection 32 is not limited to a particular shape. For example, each projection 32 may be shaped columnar or hemispherical.

In the above-illustrated embodiment, the hook portion 16 is formed by forming the recess 17 as a groove in the circumferential surface of the head 15 in the core member 10. However, the configuration of the hook portion 16 is not limited to the above configuration. For example, a portion on the distal side of the head 15 in the core member 10 may project radially outward of the core member 10 so that the hook portion 16 is formed on the distal end of the head 15 such that the head 15 has a T shape as viewed from the side.

The configuration of the rivet R may be a configuration in which the circumferential surface of the hook portion 16 does not come into contact with the basal end surface 31 of each pivoting piece 30 when the hook portion 16 of the core member 10 moves past the projection 32 of the pivoting piece 30 in the outwardly pivoted state.

In the above-illustrated embodiment, each protective wall 29 is higher than the pivoting pieces 30 in the outwardly pivoted state. However, each protective wall 29 may have the same height as the pivoting pieces 30 in the outwardly pivoted state. Even in this case, the above advantage (3) is achieved. Furthermore, each protective wall 29 may be omitted.

The restrictive projections 24 of the sleeve 20, and the first restrictive depressions 14a and the second restrictive depressions 14b of the core member 10 may be omitted.

A mounting portion for mounting another member may be arranged in the core member 10, the flange 25 of the sleeve 20, and the like. The mounting portion may be, for example, a screw hole, a hook, or a bolt. In this case, it is possible to mount another member to a member on which the rivet R is mounted via the mounting portion arranged in the rivet R.

For example, it is difficult to mount another member to corrugated plastic by screwing because the corrugated plastic has a hollow inside structure. However, when a screw hole as the mounting portion is arranged in the core member 10, it is possible to screw another member to the corrugated plastic using the screw hole of the rivet R by mounting the rivet R to the corrugated plastic.

REFERENCE NUMERALS

R . . . rivet, 10 . . . core member, 15 . . . head, 16 . . . hook portion, 20 . . . sleeve, 23 . . . accommodation portion, 25 . . . flange, 28 . . . hinge, 29 . . . protective wall, 30 . . . pivoting piece, 31 . . . basal end surface, 32 . . . projection, 32a . . . lateral surface.

The invention claimed is:

1. A rivet comprising:
   a sleeve, which has a flange;
   a core member, which is inserted into the sleeve;
   a plurality of pivoting pieces, which are arranged on a distal end of the sleeve; and
   hinges, which couple the distal end of the sleeve to the respective pivoting pieces, wherein
   each of the pivoting pieces is pushed against the core member by inserting the core member into the sleeve, so that the pivoting pieces pivot outward,
   a projection is arranged on a basal end surface of each of the pivoting pieces to fix the pivoting piece,
   a hook portion is arranged on the core member to project outward in a radial direction of the core member, and
   the pivoting pieces are fixed when the core member is inserted into the sleeve so that the hook portion of the core member moves past the projections of the pivoting pieces in an outwardly pivoted state and a circumferential surface of the hook portion comes into contact with the basal end surfaces of the pivoting pieces.

2. The rivet according to claim 1, wherein a plurality of protective walls are arranged on a distal end of the sleeve to protect the pivoting pieces in the outwardly pivoted state.

3. The rivet according to claim 2, wherein
   each of the protective walls has a height from the distal end of the sleeve, and
   the height is set to be the same as or greater than that of each of the pivoting pieces in the outwardly pivoted state.

4. The rivet according to claim 1, wherein a lateral surface of each projection that faces the hinge is inclined such that the distance from the corresponding hinge increases from a basal end toward a distal end.

* * * * *